(12) United States Patent
Horikiri

(10) Patent No.: US 6,804,723 B1
(45) Date of Patent: Oct. 12, 2004

(54) REMOTE PROCEDURE CALLING EXPRESSION GENERATION SYSTEM

(75) Inventor: Kazunori Horikiri, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 729 days.

(21) Appl. No.: 09/643,738

(22) Filed: Aug. 23, 2000

(30) Foreign Application Priority Data

Sep. 3, 1999 (JP) .......................................... 11-249606

(51) Int. Cl.$^7$ ............................................... G06F 15/16

(52) U.S. Cl. ........................ 709/330; 709/201; 709/217; 709/219; 709/226; 709/315; 707/103

(58) Field of Search ................................ 709/201, 217, 709/219, 226, 330, 315

(56) References Cited

U.S. PATENT DOCUMENTS

| | | | | |
|---|---|---|---|---|
| 5,218,699 | A | * | 6/1993 | Brandle et al. |
| 5,838,916 | A | * | 11/1998 | Domenikos et al. |
| 5,968,127 | A | * | 10/1999 | Kawabe et al. |
| 6,044,205 | A | * | 3/2000 | Reed et al. |
| 6,192,407 | B1 | * | 2/2001 | Smith et al. |
| 6,377,991 | B1 | * | 4/2002 | Smith et al. |
| 6,389,460 | B1 | * | 5/2002 | Stewart et al. |

FOREIGN PATENT DOCUMENTS

JP    A-6-75892    3/1994

OTHER PUBLICATIONS

The Common Gateway Interface; http://hoohoo.ncsa.uiuc.edu/cgi/; Sep. 7, 2000.
A Web of Distributed Objects; Owen Rees et al.; http://www.w3.org/Conferences/WWW4/Papers/85/; Aug. 24, 2000.
The Multipurpose Protocol Mediation System: DeleGate; Y Sato et al.; Bulletin of the Electrotechnical Laboratory, vol. 59, No. 6, 1995, pp. 1–17.

* cited by examiner

*Primary Examiner*—Hosain Alam
*Assistant Examiner*—Michael Won
(74) *Attorney, Agent, or Firm*—Oliff & Berridge PLC

(57) ABSTRACT

To dynamically and efficiently generate URL for a complex remote procedure call composed by combining plural procedure servers in WWW resource space, a hyperobject is provided with a URL generation rule storage section for storing a URL generation rule for generating URL as a procedure calling expression, an attribute storage section for storing an attribute value and a link storage section for storing link information of the other hyperobjects. The URL generation rule is described according to a predetermined syntax rule for describing a URL generation rule element for the reference to an attribute value and a link. The hyperobject includes procedures that interprets the URL generation rule and refers to a value of an attribute included as a generation rule element and processing for acquiring each of the result of the generation of URL in a linked hyperobject. The processing is activated in response to a request for generating URL and a procedure calling expression in a URL format is dynamically generated. A request for generating URL is reflexively issued to a linked hyperobject.

6 Claims, 3 Drawing Sheets

REMOTE PROCEDURE CALLING EXPRESSION GENERATION SYSTEM

BACKGROUND OF THE INVENTION

1. Field of the Invention

The present invention relates to a remote procedure calling expression generation system for generating a procedure calling expression to execute a procedure remotely in a distributed computing environment where a resource object and a procedure for executing processing for a resource object are distributed, particularly relates to a remote procedure calling expression generation system for generating a procedure calling expression for requesting high functional service having high value added by combining plural remote procedure servers.

More specifically, the present invention relates to a remote procedure calling expression generation system for dynamically and efficiently generating a calling expression for calling complex service acquired by synthesizing plural remote procedures in a distributed computing environment where a resource object and the contents of processing respectively provided by each server vary dynamically.

The present invention targets a world wide web (WWW) system developed on the Internet which is a worldwide network as distributed computing system and can be applied in the case processing for a hyper text transfer protocol (HTTP) object which each HTTP server in WWW resource space manages, that is, a remote procedure is called using an HTTP request including a uniform resource locator (URL).

2. Description of the Related Art

Recently, technology related to network computing for mutually connecting computer systems via a network is actively developed. The object of the connection of computers via a network is made up of sharing mutual computer resources and the distribution and sharing of information.

For a communication medium for connecting computers, a local area network (LAN) installed in limited space such as inside an enterprise and an institute and a wide area network (WAN) in which LANs are connected via a dedicated line and others can be given. Recently, the Internet which is an enormous network covering the world is actively utilized. The Internet is a worldwide wide area network as the name shows and servers (mainly UNIX workstations) on the Internet are connected according to a transmission control protocol/internet protocol (TCP/IP).

Each resource object distributed on the Internet is specified by a reference (or a name) in a format of a URL. The URL means a character string for specifying the name and the location of a resource in resource space such as a network and is described in a format of a scheme name (a protocol name)://host name (domain name):port number/path name (fine name). URL is described in requests for comments (RFC) 1738 and 1808 for example. Also, a host name described above complies with a domain name system which is name service used in a network according to TCP/IP.

Various resource provision services are open on the Internet. WWW which is the typical example is a distributed information retrieval system for widely providing a resource object with hyperlink structure described in language in a markup format of hyper text markup language (HTML) on the Internet. A resource access is normally performed between a WWW server and a WWW client according to HTTP. HTML is described in RFC 1866 for example. Each resource object in an HTML format is also provided with a reference in a URL format described above. HTTP is described in RFCs 1945 and 2068 for example.

Currently, most computer systems on networks including the Internet are configured in distributed environment. This comes from the fact that in a centralized system, a load concentrates on one host, the host cannot meet increased clients and distributed environment that enables mutual equal connection is excellent in the extension of a network and safety.

In distributed network environment, each user is not required to recognize the location of a resource object such as a program and data particularly. Also, a procedure and a method executed by a computer are distributively stored and managed on a network. For example, a method called a remote procedure call (RPC) or a remote method invocation (RMI) that a process run on one computer on a network invokes a procedure for a process run on another computer and has the process executed is also widely adopted. Such a remote procedure call can be suitably implemented by describing an interface of an executed procedure beforehand and installing it in both a calling computer and a called computer.

One of typical examples of a remote procedure call is the topology of an application program called a common gateway interface (CGI). When CGI is used, a WWW client user can issue a request for CGI by entering his/her own personal information and the contents of a request such as a retrieval item in an input form prepared on the screen of a WWW browser and sending it. A WWW server on the other hand activates an external program (a CGI program) according to CGI because the server itself has no function for processing a request for CGI to have the request for CGI processed. The external program may also be activated on the same WWW server and on another server. The external program retrieves a database according to a retrieval item CGI of which is requested for example and returns the result of processing to the WWW server in an HTML format. When the WWW server transfers this to the WWW client, a WWW page meeting the request is provided on the WWW browser screen of the WWW client.

CGI is a standard protocol in which an environmental variable, a command line, standard input, standard output between a server and a CGI program and others are defined and if only this protocol is met, a CGI program may also be described in any language format. For example, a CGI program can be generated using various language such as Visual Basic, C language, Delphi and Perl (generally, Perl in which the processing of a character string is easy is often used in UNIX and Visual Basic is often used in Windows NT).

However, CGI is not provided with a mechanism required for a CGI application program to activate service provided by further another WWW server and others. That is, it is difficult to provide complex service by combining plural remote procedure servers.

Also, Japanese Published Unexamined Patent Application No. Hei 6-75892 discloses another example of a remote procedure call. A remote procedure manager described in the patent application is provided with a system remote procedure request unit that requests a remote procedure for service provided by a system, a system remote procedure execution unit that executes processing for the remote procedure for the service provided by the system, a system remote procedure management unit that manages plural remote procedures for the service provided by the system corresponding to the system remote procedure execution unit based upon a remote procedure identifier unique in the network system and a system procedure preprocessor that is called by a stub for executing a remote procedure call, that inquires of the system remote procedure management unit, that decides a remote procedure for the system to be called and that calls the corresponding system remote procedure execution unit.

According to the remote procedure manager, if a stub on the remote side judges that a remote procedure call is not a remote procedure for application service when the remote procedure call of system service is executed by the system remote procedure request unit, the system procedure preprocessor is called and can call the remote procedure for the system service by retrieving the system remote procedure management unit using a requested remote procedure identifier and having the system remote procedure execution unit for executing calling service execute decision processing without defining a remote procedure for system service in an interface between application programs.

Also, ANSA information service framework of Architecture Projects Management Limited (England) is a distributed system based upon common object request broker architecture (CORBA) and WWW. In the distributed system, an Internet Inter-ORB Protocol (HOP) for transferring a general Inter-ORB protocol using an Internet protocol (IP) is used and an access from WWW to a CORBA object is enabled by preparing a gateway for converting HTTP to HOP and a gateway for converting HOP to HTTP.

ANSA information service framework is described in "A Web of Distributed Object, The ANSA Project" (http://www.ansa.co.uk/ANSA/ISF/wdistobj/Overview.html written by 0. Rees, N. Edwards, M. Madsen, M. Beasley and A. McClenaghan and published in 1995 by Architecture Projects Management, Ltd. for example.

Also, DeleGate is a multiple use protocol relay system researched and developed by Yutaka Sato, an employee at Electrotechnical Laboratory. DeleGate provides various functions of path control, access control, protocol conversion, character code conversion, code conversion in Multipurpose Internet Mail Extensions (MIME), a data cache, a connection cache, relay for an existing application and mounting. However, DeleGate does not provide a system such as synthesizes a remote procedure call desired by a user by combining plural DeleGates in a network.

DeleGate is disclosed in "Multiple Use Protocol Relay System DeleGate" (Vol. 59, No. 6)(ftp://etlport.etl.go.jp/pub/DeleGate/ETL-BULLETIN-95-06.ps.gz) written by Yutaka Sato and published in 1995 by Electrotechnical Laboratory for example.

Recently, the provision of further high functional service having high value added by combining plural remote procedure servers has been requested.

FIG. 3 schematically shows circumstances in which a complex resource object is provided by synthesizing plural remote procedures.

In an example shown in FIG. 3, a server B provides the result $O_B$ of the execution of a procedure $P_B$ which takes an object OBI and an object $O_{B2}$ as inputs. Also, a server C provides, the result $O_C$ of the execution of a procedure $P_C$ which takes an object $O_{C1}$, an object $O_{C2}$ and an object OD output by a procedure PD executed by a server D as inputs. A server A executes a procedure PA for acquiring the objects $O_B$ and $O_C$ respectively provided by the servers B and C.

The procedures $P_A$, $P_B$, - - - in each server A, B, - - - apply the processing such as the association and concatenation of input objects to the input objects. Also, if an object is an HTTP object for outputting a WWW page, processing provided by each server A, B, - - - may also be the generation of the summary of WWW page information including a screen showing a reduced page, a header and the display of a reference link and the combination of pages.

Each of the remote procedure servers A, B, - - - may also belong to the same steering body and may also be divided into different corporate bodies and organizations. Further, each remote procedure server A, B, - - - may also be distributed all over the world.

To implement complex resource provision service shown in FIG. 3, a mechanism in which plural remote procedure servers are combined, that is, in which a called remote procedure further calls another remote procedure server is required.

URL is originally used for a name, that is, an identifier of a resource object, however, recently, URL is also often utilized for a call of a procedure. For example, the execution of a remote procedure can be requested by sending URL generated by concatenating a server which manages a procedure and a procedure name to be called as an HTTP message. For example, in Internet drafts by Internet Engineering Task Force (IETF), it is defined that URL should be used to call a CGI program.

Further, if a service in which plural remote procedure servers are combined is requested, URL generated by synthesizing URL character strings specifying each remote procedure can be utilized for a remote procedure calling expression.

A URL character string synthesized to call plural remote procedure servers is necessarily complex. If the contents of processing included in a remote procedure, that is, a remote procedure to be called is fixed, URL once generated can be continuously used. However, actually, in an open distributed network, the combination of remote procedure calls can vary from moment to moment. In the example shown in FIG. 3, there is a case where the contents $P_B$ of processing executed by the remote procedure server B are to be changed from the merge of the objects $O_{B1}$ and $O_{B2}$ to the summary of the objects $O_{B1}$ and $O_{B2}$. Or as the remote procedure server D in charge of a part of a series of processing is closed, there is also a case where the contents of processing executed by the remote procedure server C are required to be modified.

In such a case, every time the combination of remote procedures is varied, a synthetic URL expression for a remote procedure call first generated is required to be modified or changed. As the combination of called remote procedures becomes complex and comes to have multiple levels, work for modifying or changing a synthetic expression becomes more and more troublesome and difficult.

Also, all sites related to a remote procedure call do not belong to the same organization and it is impossible to completely grasp the change of the combination of remote procedure calls at one certain specific site. For example, in the example shown in FIG. 3, for a site in a route in which a final WWW page is passed to a client, in such a case, work for generating a synthetic URL expression for a remote procedure call is not only troublesome but almost impossible.

SUMMARY OF THE INVENTION

The invention is made to solve the technical problems described above and provides an excellent remote procedure calling expression generation system in which a procedure calling expression for executing a procedure remotely can be dynamically and efficiently generated in a distributed computing environment where a resource object and a procedure for processing for a resource object are distributed.

The invention further provides an excellent remote procedure calling expression generation system in which a procedure calling expression for enabling requesting high functional service having high value added by combining plural remote procedure servers can be dynamically and efficiently generated.

The invention further provides an excellent remote procedure calling expression generation system in which a procedure calling expression for calling complex service made up of synthesizing plural remote procedures can be dynamically and efficiently generated.

The invention further provides an excellent remote procedure calling expression generation system in which URL for requesting complex service made up of combining plural remote procedure servers can be dynamically and efficiently generated in WWW resource space where an HTTP object and processing for an HTTP object, that is, a procedure (method), are distributed.

The invention further provides an excellent remote procedure calling expression generation system in which URL for requesting complex service made up of combining plural remote procedure servers can be dynamically and efficiently generated in WWW resource space where an HTTP object and processing for an HTTP object, that is, a procedure (method), are distributed.

The invention is made to solve the problems described above, a first aspect is based upon a system for generating a remote procedure calling expression for requesting service made up by combining plural procedures in resource space in which a resource object and a procedure for processing a resource object are distributed and relates to a remote procedure calling expression generation system characterized in that plural hyperobject sections are provided, each hyperobject section is provided with a procedure calling expression generation rule storage section for storing a procedure calling expression generation rule for generating a procedure calling expression, one or more attribute storage sections for storing an attribute value and a link storage section for storing one or more pieces of link information of the other hyperobject sections, and a procedure calling expression generation rule stored in the procedure calling expression generation rule storage section includes a character string according to a predetermined syntax rule for describing one or more generation rule elements made up of the reference to an attribute value and/or the reference to the result of the generation of a procedure calling expression in the linked hyperobject section.

The hyperobject section described above may also be further provided with a generation rule element extracting section for interpreting a procedure calling expression generation rule stored in the procedure calling expression generation rule storage section according to the predetermined syntax rule and extracting a generation rule element, a section for searching the attribute storage section if the extracted generation rule element is the reference to an attribute value and substituting the corresponding attribute value for the generation rule element and a section for issuing a request for generating a procedure calling expression to the Linked hyperobject section if the extracted generation rule element is the reference to the result of the generation of a procedure calling expression in the linked hyperobject section and substituting the result of the generation of the procedure calling expression by the linked hyperobject section for the generation rule element. A procedure calling expression for requesting complex service made up of combining plural procedures can be dynamically and efficiently generated by activating these sections in response to a request for generating a procedure calling expression.

The hyperobject section described above may also be an object-oriented program for generating a hypertext. The program can be described using Java programming language for example.

Also, a second aspect of the invention is based upon a remote procedure calling expression generation system for generating URL for requesting service made up by combining plural procedure servers in WWW resource space in which an HTTP object and a procedure for processing an HTTP object are distributed and relates to a remote procedure calling expression generation system characterized in that plural hyperobject sections are provided, each hyperobject section is provided with a URL generation rule storage section for storing a URL generation rule for generating URL as a procedure calling expression, one or more attribute storage sections for storing an attribute value and a link storage section for storing one or more pieces of link information of the other hyperobject sections, and a URL generation rule stored in the URL generation rule storage section includes a character string according to a predetermined syntax rule for describing one or more URL generation rule elements including the reference to an attribute value and/or the reference to the result of the generation of URL in the linked hyperobject section.

The hyperobject section described above may also be further provided with a URL generation rule element extracting section for interpreting a URL generation rule stored in the URL generation rule storage section according to the predetermined syntax rule and extracting a URL generation rule element, a section for searching the attribute storage section if the extracted URL generation rule element is the reference to an attribute value and substituting the corresponding attribute value for the URL generation rule element and a section for issuing a request for generating URL to the linked hyperobject section if the extracted URL generation rule element is the reference to the result of the generation of URL in the linked hyperobject section and substituting the result of the generation of URL by the linked hyperobject section for the URL generation rule element. A procedure calling expression for requesting complex service made up by combining plural procedure servers in WWW resource space can be dynamically and efficiently generated by activating these sections in response to a request for generating URL.

Also, a third aspect of the invention is based upon a hyperobject for generating a remote procedure calling expression for requesting service made up by combining plural procedures in resource space in which a resource object and a procedure for processing a resource object are distributed and relates to a hyperobject characterized in that a procedure calling expression generation rule storage section for storing a procedure calling expression generation rule for generating a procedure calling expression, one or more attribute storage sections for storing an attribute value and a link storage section for storing one or more pieces of link information of the other hyperobjects are provided, wherein a procedure calling expression generation rule stored in the procedure calling expression generation rule storage section includes a character string according to a predetermined syntax rule for describing one or more generation rule elements including the reference to an attribute value and/or the reference to the result of the generation of a procedure calling expression in a linked hyperobject.

The hyperobject in the third aspect of the invention is an object-oriented program for generating a hypertext for example and can be described using Java programming language. The hyperobject can include processing including a step for interpreting a procedure calling expression generation rule stored in the procedure calling expression generation rule storage section according to the predetermined syntax rule and extracting a generation rule element, a step for searching the attribute storage section if the extracted generation rule element is the reference to an attribute value and substituting the corresponding attribute value for the generation rule element and a step for issuing a request for generating a procedure calling expression to the linked hyperobject if the extracted generation rule element is the reference to the result of the generation of a procedure calling expression in the linked hyperobject and substituting the result of the generation of the procedure calling expression by the linked hyperobject for the generation rule element. A procedure calling expression for requesting complex service made up by combining plural procedures can be dynamically and efficiently generated by activating such processing in response to a request for generating a procedure calling expression.

Also, a fourth aspect of the invention is based upon a hyperobject for generating URL for requesting service made up by combining plural procedure servers in WWW resource space in which an HTTP object and a procedure for processing an HTTP object are distributed and relates to a hyperobject characterized in that a URL generation rule storage section for storing a URL generation rule for generating URL as a procedure calling expression, one or more attribute storage sections for storing an attribute value and a link storage section for storing one or more pieces of link information of the other hyperobjects are provided, wherein a URL generation rule stored in the URL generation rule storage section includes a character string according to a predetermined syntax rule for describing one or more URL generation rule elements including the reference to an attribute value and/or the reference to the result of the generation of URL in a linked hyperobject.

The hyperobject related to the fourth aspect of the invention is an object-oriented program for generating a hypertext for example, is described using Java programming language and can be activated on a WWW browser. The hyperobject can include processing having a step for interpreting a URL generation rule stored in the URL generation rule storage section according to the predetermined syntax rule and extracting a URL generation rule element, a step for searching the attribute storage section if the extracted URL generation rule element is the reference to an attribute value and substituting the corresponding attribute value for the URL generation rule element and a step for issuing a request for generating URL to a linked hyperobject if the extracted URL generation rule element is the reference to the result of the generation of URL in the linked hyperobject and substituting the result of the generation of URL by the linked hyperobject for the URL generation rule element. A procedure calling expression in a URL format for requesting complex service made up by combining plural procedure servers in WWW resource space can be dynamically and efficiently generated by activating such processing in response to a request for generating URL.

Other characteristics and advantages of the invention will become clear by the more detailed description of an embodiment described later of the invention based upon the attached drawings.

BRIEF DESCRIPTION OF THE DRAWINGS

A preferred embodiment of the invention will be described in detail based on the followings, wherein.

DETAILED DESCRIPTION OF THE PREFERRED EMBODIMENT

Figure 1:
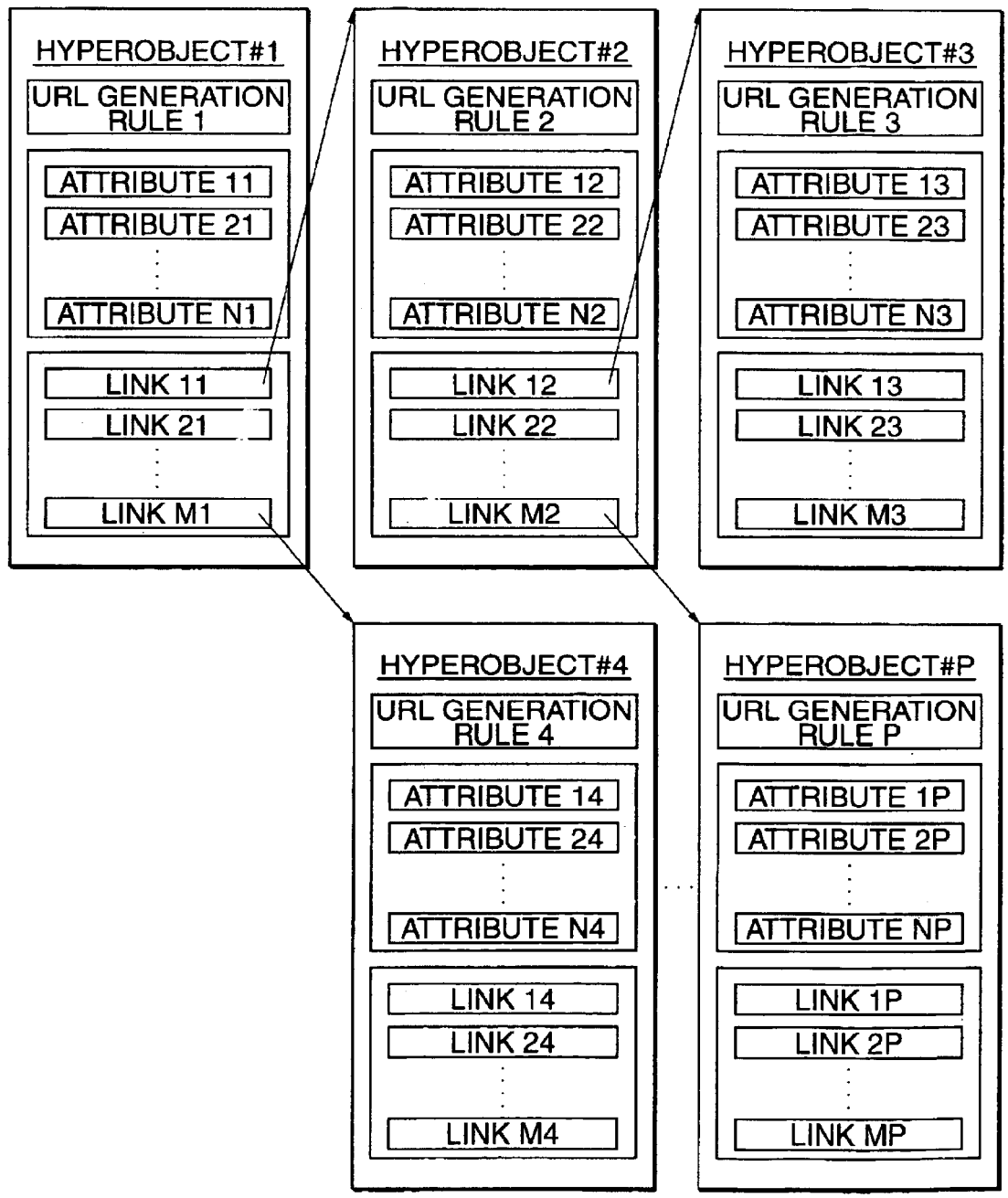
FIG. 1 schematically shows a remote procedure calling system in an embodiment of the invention.

Referring to the drawings, an embodiment of the invention will be described in detail below.

Generally, a remote procedure calling system including one or more hyperobjects. Each hyperobject shall be located in a distributed computing environment. That is, each hyperobject may also be located on one server connected via a distributed network (not shown) and may also be distributed to different servers.

A hyperobject means an object in which reference relationship with another object, that is, hyperlink structure is formed. Also, an object includes data and processing for the data. In the case of a resource object treated in HTTP resource space such as WWW, a hyperobject can be described in Java developed by Sun Microsystems for example.

A case where a remote procedure is implemented by P hyperobjects will be considered below. FIG. 1 schematically shows the remote procedure calling system.

A hyperobject #i (i shall be an integer larger than 0 and equal to or smaller than P) includes a URL generation rule storage, Ni pieces of attribute storages and Mi pieces of link storages.

The URL generation rule storage stores a rule for generating URL in the format of a character string. URL described above is not only an object identifier for uniquely defining a resource object in a distributed network but a remote procedure calling expression. Processing which a hyperobject includes can generate URL according to an algorithm which a character string stored in the URL generation rule storage defines. However, a procedure for generating URL will be described in detail later.

The attribute storage stores an attribute given to a hyperobject in the form of the combination of an attribute name and an attribute value. In this specification, an attribute name and an attribute value are both a character string in a text format for the convenience of explanation, however, generally, an attribute value may be described in an arbitrary data format.

The link storage stores a link with another hyperobject or with its own hyperobject. In this embodiment, both URL in WWW and an internal reference in program execution environment can be treated as a link. Generally, a link has only to be a reference by which an object can be identified in distributed computing environment. A linked hyperobject shall be treated as a child of a hyperobject that links below.

Next, a URL generation rule treated in this embodiment will be described. The URL generation rule is a character string defined according to the following syntax.

[Expression 1]

G→V|C|A|Alpha

G→GG

V →{Alpha}

C→{children}

A→&G

Alpha→character string made up of characters except { }

G described above denotes a set of URL generation rules, V described above denotes a notation for referring to an attribute value, C described above denotes a notation for referring to the result of the generation of URL in a hyperobject equivalent to a child, A described above denotes a notation for an argument in URL and Alpha described above denotes one or more arbitrary character strings made up of characters except { }.

In the syntax used in this embodiment of URL generation rules, a character such as "{",''}" and "&" is used for a terminal symbol (or a delimiter). However, a character or a character string except the characters described above can be used for a terminal symbol in a range compatible with the syntax. Also, a terminal symbol {children} for referring to the result of the generation of URL according to a URL generation rule of a hyperobject equivalent to a child may also be replaced by another character string in a range compatible with the syntax.

For an example of a URL generation rule, the following character string which the URL generation rule 1 of a hyperobject #1 has will be described below.

[Expression 2]

http://foo.co.jp/{name}/{date}

The URL generation rule 1 includes two notations {name} and {date} for referring to an attribute. In this case, URL generation algorithm refers to the attribute storage and substitutes the attribute value of an attribute name "name" for {name} in a character string.

Next, a procedure for generating URL will be described below using a remote procedure call made up of four hyperobjects shown in FIG. 2 as an example.

A hyperobject #1 shall store the following character string as the URL generation rule 1.

[Expression 3]

http://foo.co.jp/bin/procedure? {children}&name={name} & info={description} & option=1

Also, an attribute storage 11 shall store "object 1" as an attribute value of the attribute name "name" and an attribute storage 12 shall store "root node" as an attribute value of an attribute name "description". Also, a link storage 11 shall store reference to a hyperobject #2 and a link storage 21 shall store reference to a hyperobject #4.

Also, the hyperobject #2 shall store the following character string as a URL generation rule 2.

[Expression 4]

http://bar.co.jp/bin/open?owner={user}

Also, an attribute storage 12 of the hyperobject #2 shall store "horikiri" as an attribute value of an attribute name "user" and a link storage 12 shall store reference to a hyperobject #3.

Also, the hyperobject #3 shall store the following character string as a URL generation rule 3.

[Expression 5]

http://www/fujixerox.co.jp

Also, the hyperobject #4 shall store "time={date}" as the URL generation rule 4 and an attribute storage 14 shall store "1999/6/18" as an attribute value of an attribute name "date".

In this embodiment, each hyperobject executes URL generation processing according to the following algorithm 1 in response to a request for generating URL. Algorithm 1

(1) A character string showing a URL generation rule is fetched from the URL generation rule storage and is decomposed based upon a syntax rule.

(2) Processing in the following steps (3) to (5) is repeatedly executed for each of extracted URL generation rule elements in a divided state.

(3) If a fetched URL generation rule element is a notation for referring to an attribute value, the corresponding attribute in the attribute storage is retrieved using an attribute name included in the notation. If the corresponding attribute exists, a character string acquired by encoding an attribute value is substituted for the URL generation rule element. If no corresponding attribute exists, a blank character string is substituted for the URL generation rule element.

(4) If the fetched URL generation rule element is a notation for referring to the result of the generation of URL in a hyperobject equivalent to a child, a request for generating URL is issued to each hyperobject equivalent to a child to be referred.

If a character string acquired from each of the child objects is a notation for an argument in URL the passed character string is concatenated to the URL character string as it is. If not, a character string given from the child object is encoded and is concatenated to "&arg=".

(5) If the fetched URL generation rule element is not a notation for reference, the corresponding character string is output as it is.

(6) If a notation for referring to the result of the generation of URL in a hyperobject equivalent to a child is not included in the fetched URL generation rule element, a request for generating URL is issued to each of hyperobjects equivalent to a child.

If a character string acquired as the result of the request for generating URL is a notation for an argument in URL, the character string is concatenated to a character string showing the result as it is and if not, a character string given from a hyperobject equivalent to a child is encoded and is concatenated to "&arg=".

Next, a processing procedure executed when a request for generating URL is issued to the hyperobject #1 will be described in detail using a case shown in FIG. 2 as an example.

The hyperobject #1 divides the URL character string shown in the expression 3 according to a syntax rule in response to the receiving of the request for generating URL and acquires the following each character string (that is, a URL generation rule element).

[Expression 6]

"http://foo.co.jp/bin/procedure?"

"{children}"

"&name="

"{name}"

"&info="

"{description}"

"&option=1"

As a URL generation rule element "http://foo.co.jp/bin/procedure?" is not a notation for reference, it is output as it is.

Also, as a URL generation rule element "{children}" is a notation for reference to a child object, a request for generating URL is reflexively issued to each of the hyperobjects #2 and #4 respectively referred as a child.

The hyperobject #2 executes the algorithm 1 as described above when it receives the request for generating URL.

That is, the hyperobject #2 first divides the URL generation rule shown in the expression 4 according to a syntax rule and acquires the following each character string (that is, a URL generation rule element).

[Expression 7]

"http://bar.co.jp/bin/open?owner="

"{user}"

As a URL generation rule element "http://bar.co.jp/bin/open?owner=" is not a notation for reference, it is output as it is.

Also, as a URL generation rule element, "{user}" is a notation for referring to an attribute value, an attribute is retrieved using the corresponding to the corresponding attribute name in the attribute storage. That is, the corresponding attribute is retrieved using the attribute name of the URL generation rule element in the attribute storage. In an example shown in FIG. 2, as "horikiri" exists as the corresponding attribute, a character string acquired by encoding an attribute value "horikiri" is substituted for the URL generation rule element.

Also, the URL generation rule 2 which the hyperobject #2 has does not include a notation for referring to the result of the generation of URL in a hyperobject equivalent to a child as a URL generation rule (refer to the expression 4). Therefore, a request for generating URL is reflexively issued to each of hyperobjects equivalent to a child (the hyperobject #3 in the example shown in FIG. 2).

When the hyperobject #3 receives the request for generating URL, it executes the algorithm 1 as described above.

That is, the hyperobject #3 first divides the URL generation rule shown in the expression 5 according to a syntax rule and acquires the following character string (that is, a URL generation rule element).

[Expression 8]

"http://fujixerox.co.jp/"

As a URL generation rule element "http://fujixerox.co.jp/" is not a notation for reference, it is output as it is. As a child object is not referred though the URL generation rule 3 which the hyperobject #3 has does not include a notation for referring the result of the generation of URL in the child object as a URL generation rule, a reflexive request for generating URL is not made.

The hyperobject #2 receives "http://fujixerox.co.jp/" from the hyperobject #3 as the result of the generation of URL. As the character string does not correspond to a notation for an argument in URL, "&arg=(http://fujixerox.co.jp)" is output. However, an encoded character string shall be shown in a parenthesis.

As a result, the hyperobject #2 outputs the following character string to the hyperobject #1 which requests the generation of URL.

[Expression 9]

"http://bar.co.jp/bun/open?owner=horikiri &arg=(http://www.fujixerox.co.jp)"

When the hyperobject #1 receives the character string described above from the hyperobject #2 as the result of the generation of URL, the following character string is output because the character string described above is not a notation for an argument in URL.

[Expression 10]

"&arg=(http://bar.co.jp/bun/open?owner=horikiri &arg=(http://www.fujixerox.co.jp))"

In the meantime, when the hyperobject #4 receives a request for generating URL, it also executes the algorithm 1 as described above.

That is, the hyperobject #4 first divides the URL generation rule, "time={date}" according to a syntax rule and acquires the following each character string (that is, a URL generation rule element).

[Expression 11]

"&time="

"{date}"

The hyperobject #4 outputs "&time=". Next, as "{date}" is a notation for referring to an attribute, a character string acquired by encoding "1999/6/18" which is an attribute value is output. Therefore, the following character string is returned to the hyperobject #1 which requests the generation of URL.

[Expression 12]

"&time={1999/6/18}"

The hyperobject #1 outputs the received character string as it is because the character string is a notation for an argument in URL.

Next, the hyperobject #1 processes the residual URL generation rule element. That is, it outputs the next element, "&tname=".

As the next URL generation rule element "{name}" is a notation for referring to an attribute, the attribute is retrieved in the attribute storage and the corresponding attribute value, "object1" is output.

Next, the hyperobject #1 outputs the next URL generation rule element "&info=".

As the next URL generation rule element "{description}" is a notation for referring to an attribute, the attribute is retrieved in the attribute storage, and a character string "{root node}" acquired by encoding the corresponding attribute value "root node" is output.

Next, the hyperobject #1 outputs the next URL generation rule element "&option=1" as it is.

As a result, the hyperobject #1 outputs the following URL synthetic expression.

[Expression 13]

http://foo.co.jp/bin/procedure?&arg=(http://bar.co.jp/bun/open?owner=horikiri &arg=(http://www.fujixerox.co.jp)) &time=(1999/6/18) &name=object1&info=(root node) &option=1")

Figure 2:
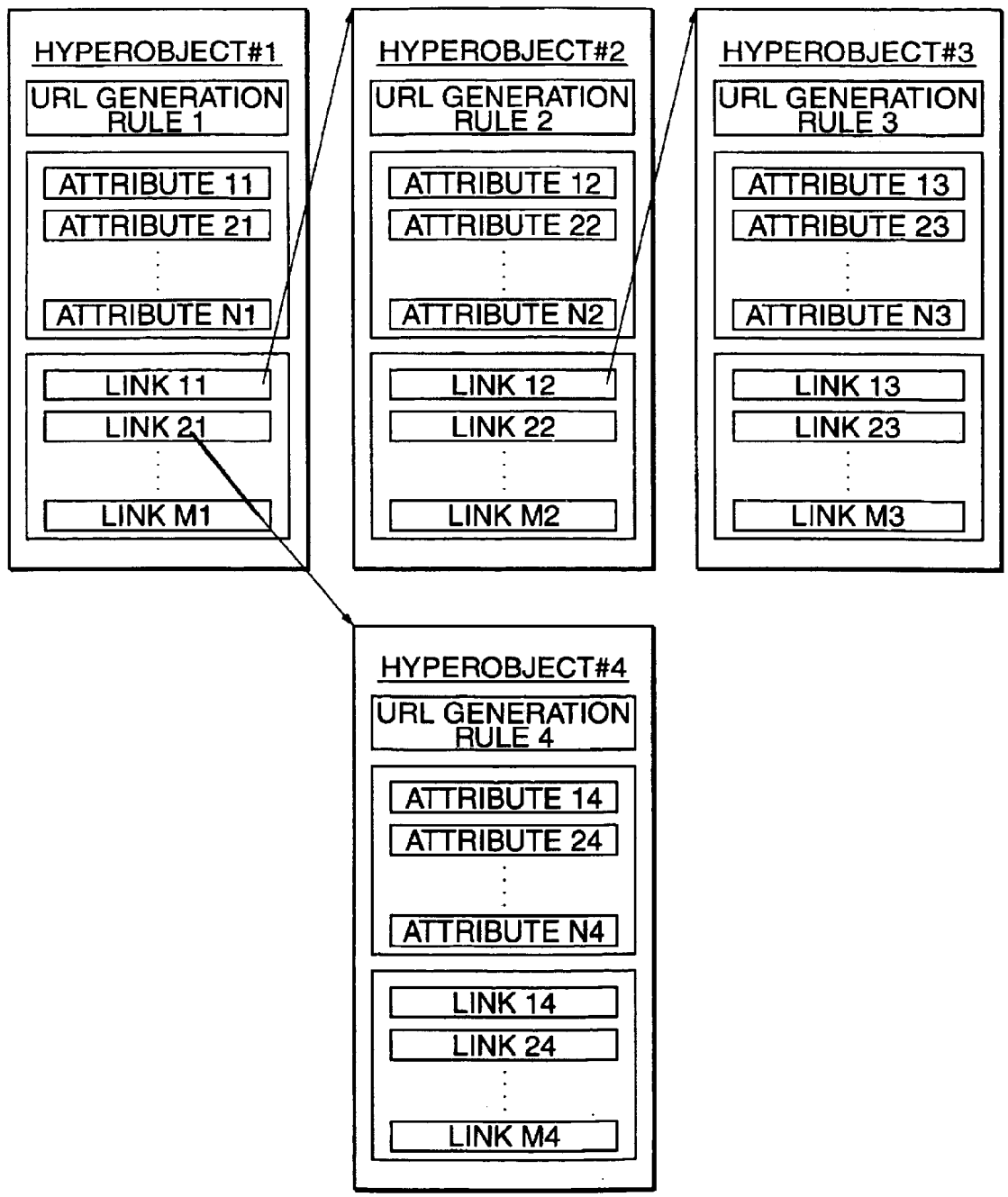
FIG. 2 is another view schematically showing the remote procedure calling system in the embodiment of the invention.
Figure 3:
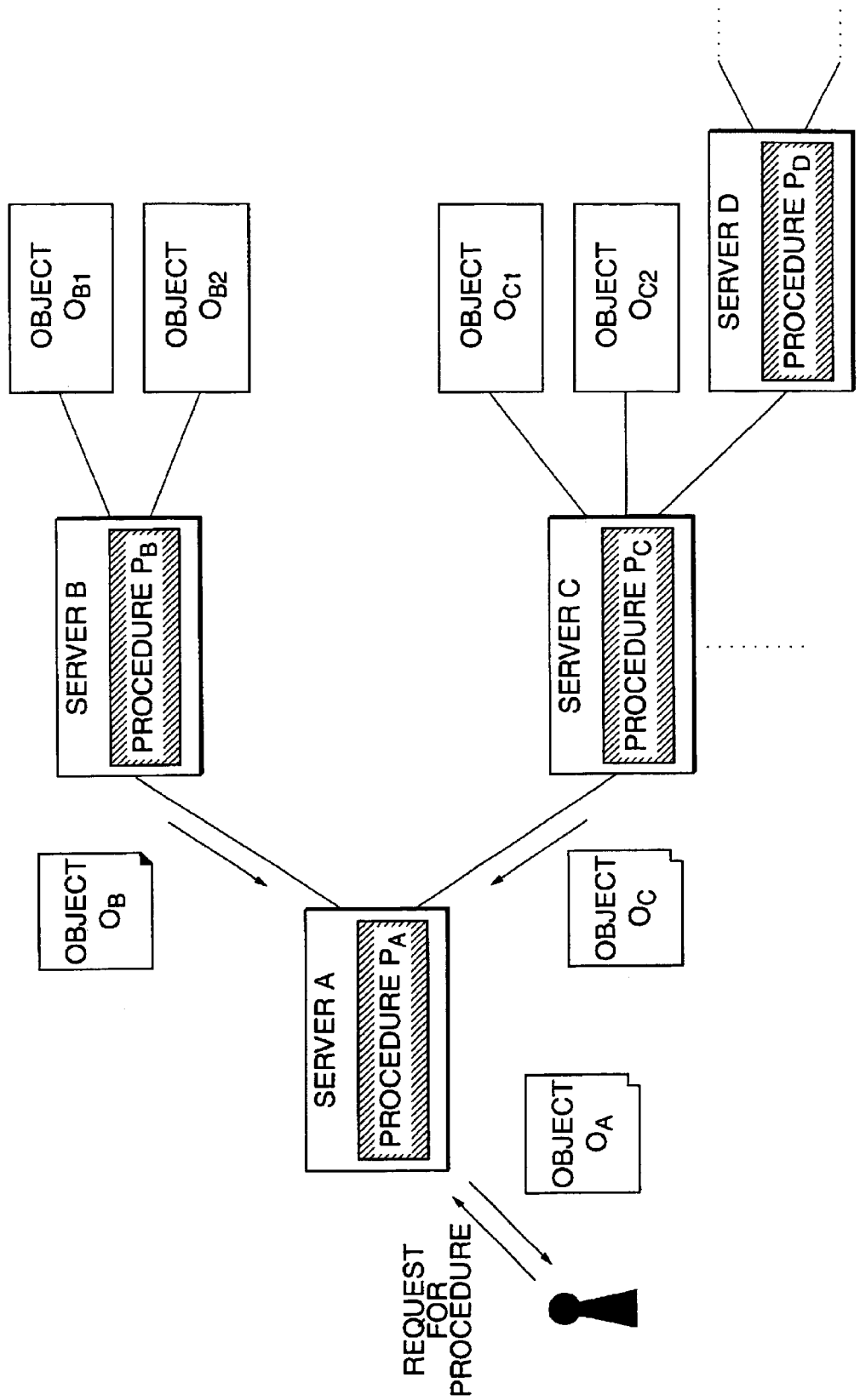
FIG. 3 schematically shows circumstances in which a complex resource object is provided by synthesizing plural remote procedures.

The URL character string described above is equivalent to a procedure calling expression for requesting service made up of the combination of plural remote procedure servers shown in FIG. 2. A user who requests the hyperobject #1 to generate URL can acquire the URL synthetic expression and can call complex service using the expression.

Referring to the specific embodiment, the invention has been described in detail above. However, it is obvious that the manufacturer can modify and substitute the embodiment in a range which does not deviate from the outline of the invention. That is, the invention has been disclosed as an embodiment and should not be limitedly interpreted. To judge the outline of the invention, the following claims should be considered.

As described in detail above, according to the invention, it is possible to provide the excellent remote procedure calling expression generation system to dynamically and efficiently generate the procedure calling expression by which a procedure can be remotely called in distributed computing environment in which a resource object and a procedure for processing a resource object are distributed.

Also, according to the invention, it is possible to provide the excellent remote procedure calling expression generation system in which the procedure calling expression for requesting high functional service having high value added made up by combining plural remote procedure servers can be dynamically and efficiently generated.

Also, according to the invention, it is possible to provide the excellent remote procedure calling expression generation system in which the calling expression for calling complex service made up by synthesizing plural remote procedures can be dynamically and efficiently generated.

Also, according to the invention, it is possible to provide the excellent remote procedure calling expression generation system in which the procedure calling expression in a URL format for calling complex service made up by combining plural remote procedure servers can be dynamically and efficiently generated in www resource space where an HTTP object and processing for an HTTP object, that is, the procedure (method) are distributed.

What is claimed is:

1. A remote procedure calling expression generation system for generating a remote procedure calling expression for requesting a service composed by combining plural procedures in a resource space in which a resource object and a procedure for processing the resource object are distributed, the system comprising:

plural hyperobject means, each of which comprises:

procedure calling expression generation rule storage means for storing a procedure calling expression generation rule for generating a procedure calling expression;

one or more attribute storage means for storing an attribute value; and link storage means for storing one or more pieces of link information of the other hyperobject means, wherein:

the procedure calling expression generation rule stored in the procedure calling expression generation rule storage means is composed of a character string according to a predetermined syntax rule for describing one or more generation rule elements composed of a reference to the attribute value and/or a reference to a result of the generation of the procedure calling expression in linked hyperobject means; and the hyperobject means is activated in response to a request for generating the procedure calling expression, the system further comprising:

generation rule element extracting means for interpreting the procedure calling expression generation rule stored in the procedure calling expression generation rule storage means according to the predetermined syntax rule and extracting the generation rule element;

means for searching the attribute storage means if the extracted generation rule element is the reference to the attribute value and substituting a corresponding attribute value for the generation rule element; and means for issuing the request for generating the procedure calling expression to the linked hyperobject means if the extracted generation rule element is the reference to the result of the generation of a procedure calling expression in the linked hyperobject means and substituting the result of the generation of the procedure calling expression by the linked hyperobject means for the generation rule element.

2. The remote procedure calling expression generation system according to claim 1, wherein the hyperobject means is a program for generating a hypertext.

3. A remote procedure calling expression generation system for generating a URL for requesting a service composed by combining plural procedure servers in a WWW resource space in which an HTTP object and a procedure for processing the HTTP object are distributed, the system comprising:

plural hyperobject means, each of which comprising:

URL generation rule storage means for storing a URL generation rule for generating a URL as a procedure calling expression;

one or more attribute storage means for storing an attribute value; and linked storage means for storing one or more pieces of link information of the other hyperobject means, wherein:

the URL generation rule stored in the URL generation rule storage means is composed of a character string according to a predetermined syntax rule for describing one or more URL generation rule elements composed of a reference to the attribute value and/or a reference to a result of the generation of the URL in linked hyperobject means; and the hyperobject means is activated in response to a request for generating the URL, the system further comprising:

URL generation rule element extracting means for interpreting the URL generation rule stored in the URL generation rule storage means according to the predetermined syntax rule and extracting the URL generation rule element;

means for searching the attribute storage means if the extracted URL generation rule element is the reference to the attribute value and substituting a corresponding attribute value for the URL generation rule element; and means for issuing the request for generating the URL to the linked hyperobject means if the extracted URL generation rule element is the reference to the result of the generation of the URL in the linked hyperobject means and substituting the result of the generation of the URL by the linked hyperobject means for the URL generation rule element.

4. A hyperobject for generating a remote procedure calling expression for requesting a service composed by combining plural procedures in a resource space in which a resource object and a procedure for processing the resource object are distributed, the hyperobject comprising:

procedure calling expression generation rule storage means for storing a procedure calling expression generating rule for generating a procedure calling expression;

one or more attribute storage means for storing an attribute value; and link storage means for storing one or more pieces of link information of the other hyperobjects, wherein:

the procedure calling expression generation rule stored in the procedure calling expression generation rule storage means is composed of a character string according to a predetermined syntax rule for describing one or more generation rule elements composed of a reference to an attribute value and/or a reference to a result of the generation of the procedure calling expression in a linked hyperobject; and the hyperobject is activated in response to a request for generating the procedure calling expression, the hyperobject further comprising:

means for interpreting the procedure calling expression generation rule stored in the procedure calling expression generation rule storage means according to the predetermined syntax rule and extracting the generation rule element;

means for searching the attribute storage means if the extracted generation rule element is the reference to the attribute value and substituting a corresponding attribute value for the generation rule element; and means for issuing the request for generating the procedure calling expression to the linked hyperobject if the extracted generation rule element is the reference to the result of the generation of the procedure calling expression in the linked hyperobject and substituting the result of the generation of the procedure calling expression by the linked hyperobject for the generation rule element.

5. The hyperobject according to claim 4, wherein the hyperobject is an object-oriented program for generating a hypertext.

6. A hyperobject for generating a URL for requesting a service composed by combining plural procedure servers in a WWW resource space in which an HTTP object and a procedure for processing the HTTP object are distributed, the hyperobject comprising:

URL generation rule storage means for storing a URL generation rule for generating a URL as a procedure calling expression;

one or more attribute storage means for storing an attribute value; and link storage means for storing one or more pieces of link information of the other hyperobjects, wherein:

the URL generation rule stored in the URL generation rule storage means is composed of a character string according to a predetermined syntax rule for describing one or more URL generation rule elements composed of a reference to the attribute value and/or a reference to a result of the generation of the URL in a linked hyperobject; and the hyperobject is activated in response to a request for generating the URL, the hyperobject further comprising:

means for interpreting the URL generation rule stored in the URL generation rule storage means according to the predetermined syntax rule and extracting the URL generation rule element;

means for searching the attribute storage means if the extracted URL generation rule element is the reference to the attribute value and substituting a corresponding attribute value for the URL generation rule element; and means for issuing the request for generating the URL to the linked hyperobject if the extracted URL generation rule element is the reference to the result of the generation of the URL in the linked hyperobject and substituting the result of the generation of the URL by the linked hyperobject for the URL generation rule element.

\* \* \* \* \*